United States Patent [19]
Shibata

[11] Patent Number: 5,268,690
[45] Date of Patent: Dec. 7, 1993

[54] RADAR SYSTEM

[75] Inventor: Kenichi Shibata, Fukuoka, Japan

[73] Assignee: Matsushita Electric Industrial Co., Ltd., Osaka, Japan

[21] Appl. No.: 857,565

[22] Filed: Mar. 25, 1992

[30] Foreign Application Priority Data

Apr. 1, 1991 [JP] Japan ................................. 3-68263

[51] Int. Cl.$^5$ ............................................. G01S 13/93
[52] U.S. Cl. ........................................ 342/41; 342/183
[58] Field of Search .......................... 342/41, 176, 183

[56] References Cited

U.S. PATENT DOCUMENTS

| | | | |
|---|---|---|---|
| 4,281,326 | 7/1981 | Anderson | 342/41 |
| 4,313,115 | 1/1982 | O'Sullivan | 342/41 |
| 4,623,966 | 11/1986 | O'Sullivan | 342/41 X |
| 4,706,090 | 11/1987 | Hashiguchi et al. | 342/41 |

Primary Examiner—T. H. Tubbesing
Attorney, Agent, or Firm—Lowe, Price, LeBlanc & Becker

[57] ABSTRACT

Herein disclosed is a radar system having a function for setting a watch alarm region, which function has been improved in operability. A region displayed in a display part surrounding the radar system is divided by two border lines. One region, for example, a region having a smaller angle contained by the two border lines, is controlled to be set as the watch alarm region in accordance with the first setting instruction from a user, the other region is next controlled to be reset as the watch alarm region when receiving the second instruction from the user within a predetermined time period. Thus, the user may select one between the divided regions as desired, through easy operations. If a wrong region has been selected as the watch alarm region, differently from the user's will, the mistake may be readily corrected.

8 Claims, 5 Drawing Sheets

RADAR SYSTEM

BACKGROUND OF THE INVENTION

1. Field of the Invention

The present invention relates to a radar system having a function for setting a watch alarm region.

2. Prior Art

In recent years, the use of general vessels such as pleasure craft and the like has been spreading. The radar systems for such the pleasure craft have been improved so as to be easily operated by an inexperienced user. In such radar systems, is often provided a function for setting a watch alarm region of a display thereof to automatically generate a collision hazard alarm. That is, upon detection of a target ahead of a vessel, the function automatically detects the appearance of an image (echo) of the target in the watch alarm region to generate, for instance, an audible alarm, so long as the watch alarm region is set, advance, in front of the vessel by the user. In thus, the function warms the user that a target appears in front of his vessel, without requiring constant vigilance to observe the radar display.

Hereinafter, will be described a conventional radar system, referring to FIG. 7. Reference numeral 36 designates a plan position indicator display including a cathoderay tube. Reference numeral 37 designates an outer periphery of a image an area shown by the display 36. Reference numeral 38 designates the center of the image, representing a position of the vessel. Reference numeral 39 is a ship heading marker, showing a direction of a bow. Reference numerals 40a and 40b are straight lines dividing a display screen of the display 36, i.e., electronic cursors (hereinafter called EBL), while 41a and 41b are circular range lines dividing the same, i.e., electronic cursors (hereinafter will be called VRM).

42a and 42b are watch alarm regions divided and specified by the EBL 40a and 40b together with the VRM 41a and 41b. Reference numeral 17 designates a target detected by a radar, and reference numeral 18 is an indication of a watch alarm function.

Reference numeral 43 designates a control panel, in which 44 and 45 are EBL and VRM indicating buttons, respectively, and 46 are shift buttons to move the EBL and VRM. Reference numeral 47 is a set button for a watch alarm region.

The two EBL 40a and EBL 40b are, in general, specified for the right- and left-sides services, respectively, of a watch alarm region desired to be set.

The watch alarm region is set as an enclosed region, of which direction is determined by the EBL 40a for the left side and EBL 40b for the right side, in order from the left to the right, clockwise (or in order from the right to the left, counter clockwise), and of which range is determined by the two VRM 41a and 41b. More concretely, a direction is determined by inputting, to begin with, a position of the EBL 40a, then a position of EBL 40b, whereby a watch alarm region is automatically set.

In the conventional way of setting of a watch alarm region, there is, however, concern that the watch alarm region may be designated in a reverse order contrary to the user's intention. For example if the user mistakenly inputs the EBL 40a and 40b shown in FIG. 7 in reverse, region 42a may be designated although the user, desires to set a watch alarm region in 42b. In such that case, in order to set a watch alarm region that is truly intended to be set by the user, the user needs to reset button 47 for the watch alarm region, after reinputting the positions of the EBL 40a and 40b. This requires the user to always designate a watch alarm region while being, aware of the distinction between the EBL 40a and 40b, thus complicating user input operation.

OBJECT AND SUMMARY OF THE INVENTION

In consideration of the conventional technique as set forth above, an object of the present invention is to provide a radar system with a function for setting a watch alarm region.

To achieve the above object, the present invention provides a radar system comprising a transmitting part for radiating radio waves, a receiving part for receiving returning waves, which have been reflected by an object, of the radio waves radiated from the transmitting part and processing received signals thereof to generate picture signals. A displaying part represents information of the picture signals generated by the receiving part. A graphics processor draws a plurality of border lines radially from about the center of a represented image in the display and arbitrarily moving the border lines in accordance with instructions from a user. A dividing circuit sectionalizes the displayed image into regions by the border lines drawn on the display screen. A the smallest region among the sectionalized regions divided by the dividing circuit as a watch alarm region in accordance with setting instructions from the user.

According to the present invention, the radar system with the function for setting a watch alarm region, is provided with the dividing circuit for dividing a region of the represented image in the display part, and the means for making a user select a region among the regions divided by the dividing means, thereby setting the selected region as the watch alarm region. That is, a constitution of the radar system is that the user selects a region among a plurality of regions, divided based on bearing angles, of an surrounding area in which center the radar is located.

BRIEF DESCRIPTION OF THE DRAWING

In order that the invention may be more readily understood, an embodiment thereof will be described, by way of example, with reference to the accompanying drawings, in which.

DESCRIPTION OF A PREFERRED EMBODIMENT

Figure 1:
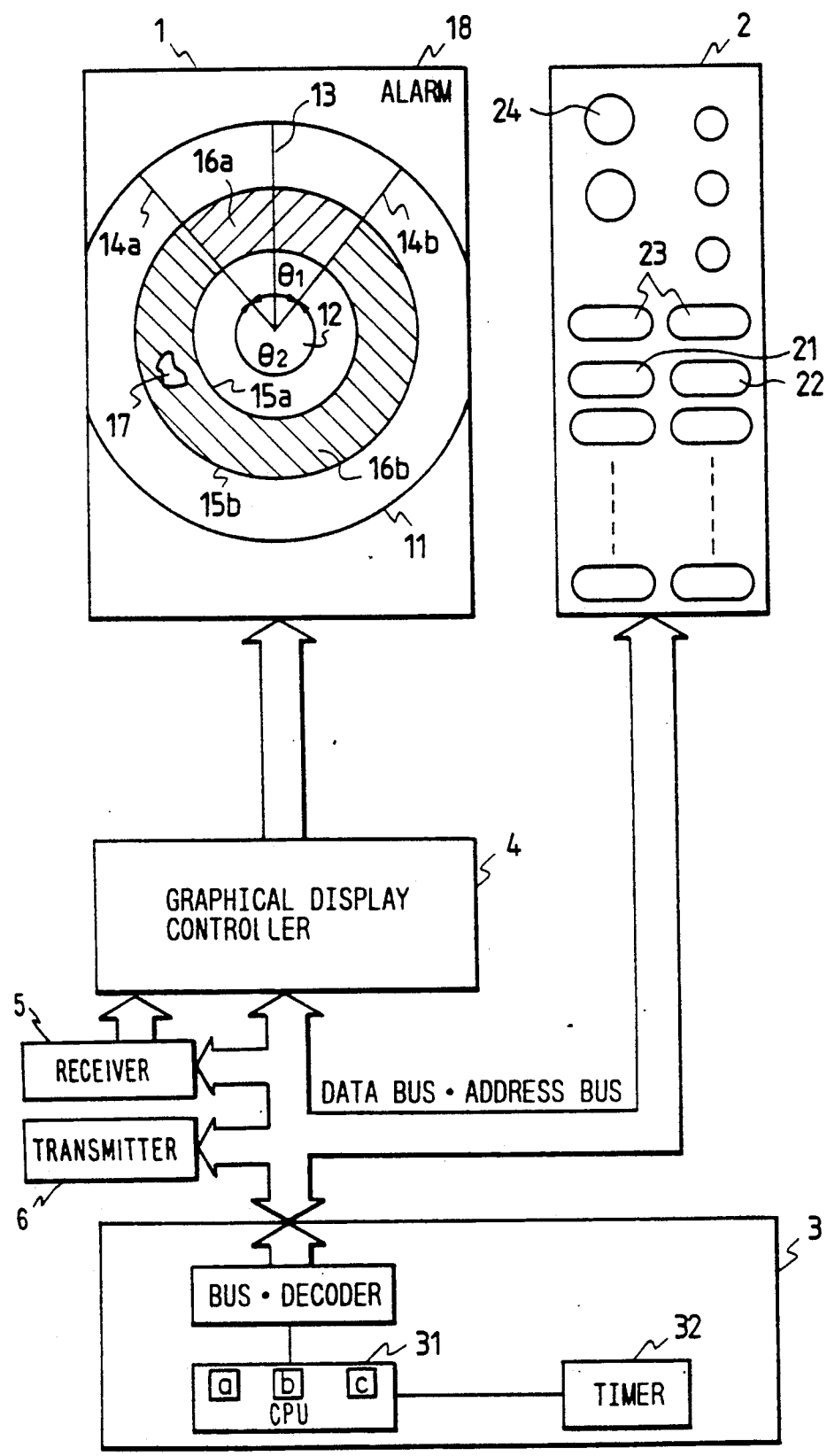
FIG. 1 is a block diagram of a radar system according to an embodiment of the present invention.

Hereinafter description will be made of an embodiment of a radar system according to the present invention, referring to the drawings.

FIG. 1 shows a block diagram of a radar according to the invention including a display part 1 controller 3, and a graphical display controller 4. Reference numeral 11 indicates an outer periphery of an image display on in display part 1, wherein a position of vessel on which the system is installed is indicated by reference numeral 12 and designates 13 a ship heading marker showing a direction of a bow of the vessel. Reference numerals 14a and 14b are electronic cursors (hereinafter will be referred EBL), composed of straight lines dividing a display screen of the display part 1 into major and minor arcuate regions. Reference numerals 15a and 15b are also electronic range cursors (hereinafter will be referred VRM), composed of circular lines also dividing the same.

Reference numerals 16a and 16b are represent respective watch alarm regions divided and specified by EBL 14a and 14b together with VRM 15a and 15b. Reference numeral 17 shows a target detected by a radar when a receiver 5 receives a wave transmitted by a transmitter 6 after reflection by the target), and 18 shows an indication of a watch alarm function. Reference numeral 31 designates a CPU of controller 3, and 32 shows a timer for setting a watch alarm region. CPU 31 performs processing to draw and position the electronic cursors or "border lines", divide the displayed image into regions defined by the border lines, and select one of the regions as a watch region. The corresponding functions are represented by modules a, b and c, respectively.

Reference numeral 2 shows an operating part, which wherein 21 and 22 are an EBL indicating button and a VRM indicating button, respectively. Reference numerals 23 are EBL and VRM shift buttons. Numeral 24 is a set button for a watch alarm region, which will be hereinafter referred as an "ALARM button".

Figure 3:
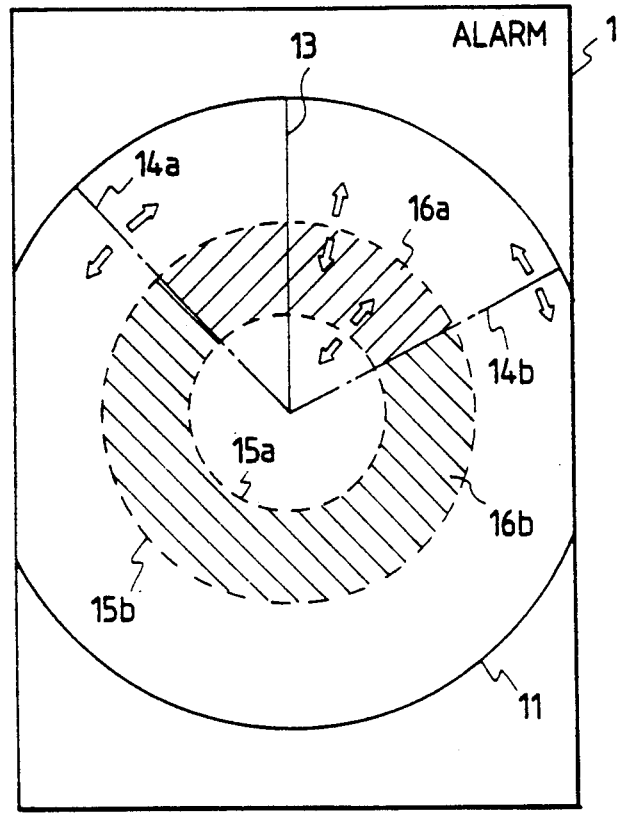
FIG. 3 shows an image in the plan position indication (PPI) display part of the radar system according to the embodiment of FIG. 1.

The display 1 of the radar system is controlled by a graphical display controller 4 so as to display a surrounding region. User selection of alarm region is performed using the EBL display button 21 and the VRM display button 22 to display two lines 14a and 14b together with another two lines VRM 15a and 15b in the display 1. The user then uses shift button 23 to move the EBLs and VRMs. As shown in FIG. 3, the two lines EBL 14a and 14b and VRM lines 15a and 15b are displaced as indicated by an arrow in the display part 1, thereby dividing it into regions and defining either one of the regions 16a or 16b, desired to be divided and set. The user pushes the ALARM button 24 of operating console 2 to designate the desired region.

Figure 2:
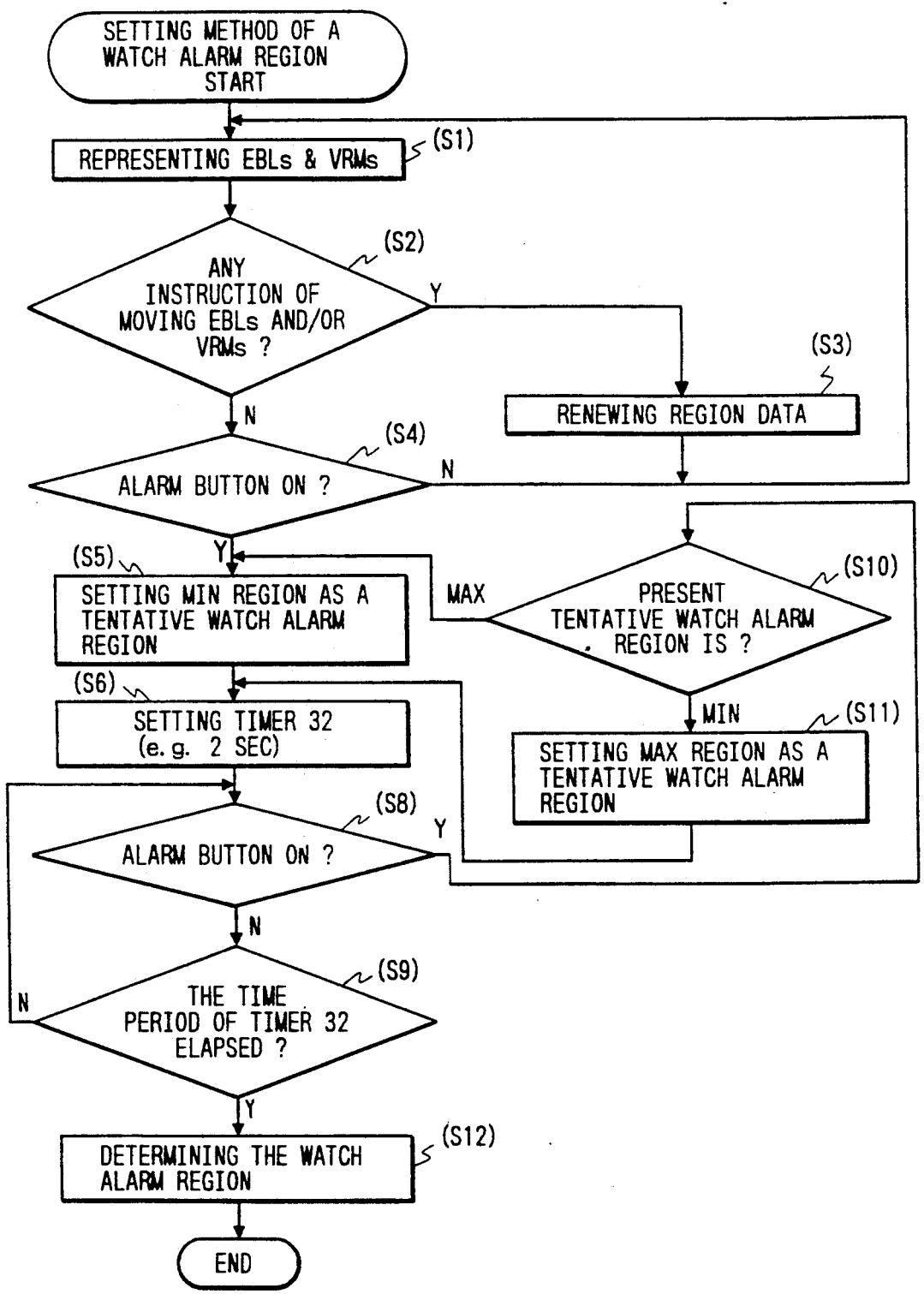
FIG. 2 is a flow chart showing processing steps in a controlling the radar system according to the embodiment of FIG. 1.
Figure 4:
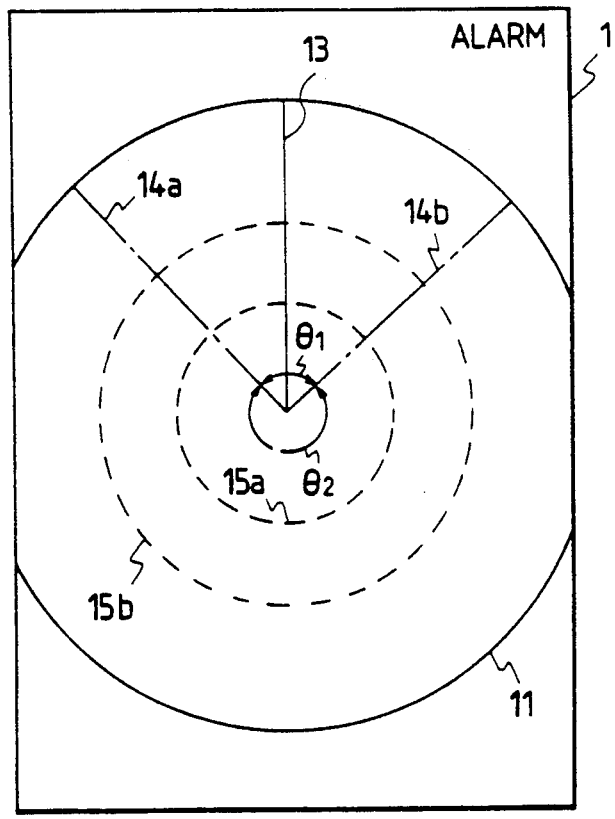
FIG. 4 shows another image of the display of the radar system according to the embodiment of FIG. 1.

FIG. 2 illustrates processing steps in the controlling controller 3. In s1 (step 1), data of the region searched by the radar is divided into search area by lines EBLs or VRMs to graphical display controller 4. In s2, detects any shift instruction from the shift buttons 23. If thereis a shift instruction from the shift buttons 23, processing advances to step s3. At step s3 the region data showing the region divided by the EBLs or VRM is renewed in accordance with said shift instruction. At s4, the system checks for operation of ALARM button 24 indicating a set instruction. Upon detection of a set instruction from the ALARM button 24 in s4, processing advances to s5. At this stage of processing display part 1 becomes a state as shown in FIG. 4, for example.

Figure 5:
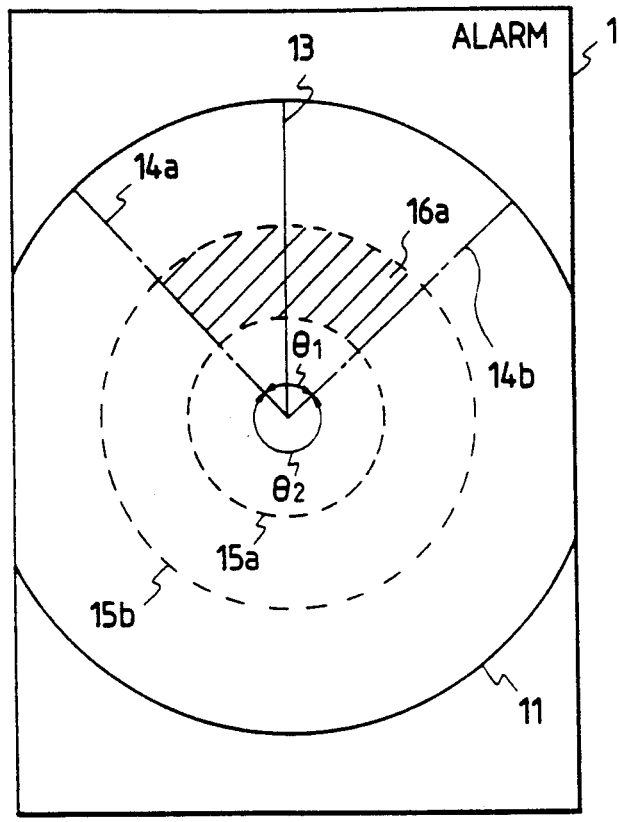
FIG. 5 shows still another represented image according to the embodiment of FIG. 1.

At step s5, controller 3 determines the smaller of the two angles $\Theta_1$ and $\Theta_2$ defined by lines EBL 14a and 14b, that is, a region based on $\Theta_1$ or a Min region 16a, as a tentative watch alarm region. Region 16a is shown in FIG. 5. At step s6, timer 32 is initialized to set a watch alarm region in the controlling part 3 at 2 seconds and initiate a countdown. At step s8, a check is performed to detect a setting instruction from the ALARM button 24 operated by the user, and at s9, check for completion of the count indicating expiration of the predetermined time period by the timer 32.

When an operation of ALARM button 24 is detected before completion of the count of the predetermined time period by the timer 32, the tentative watch alarm region is toggled between regions 16a and 16b. That is, if a setting instruction from the ALARM button 24 is detected at step s8, processing advances to s10.

At s10, processing continues to check if the tentative watch alarm region is the Min region based on the smaller angle $\Theta$, (i.e. region 16c) or the Max region based on the greater angle $\Theta_2$ (i.e., region 16b) $\Theta$. In s11, the region Max is designated based on the greater angle $\Theta_2$ as the tentative watch alarm region. If the tentative watch alarm region has been set to the Min region to be monitored at that time in S10, the region is switched into the Max region of the greater angle $\Theta$ in s11. Or, if the tentative watch alarm region has been set to the Max region is s10, processing advances to s5 to switch the region to be monitored to the Min region.

Figure 6:
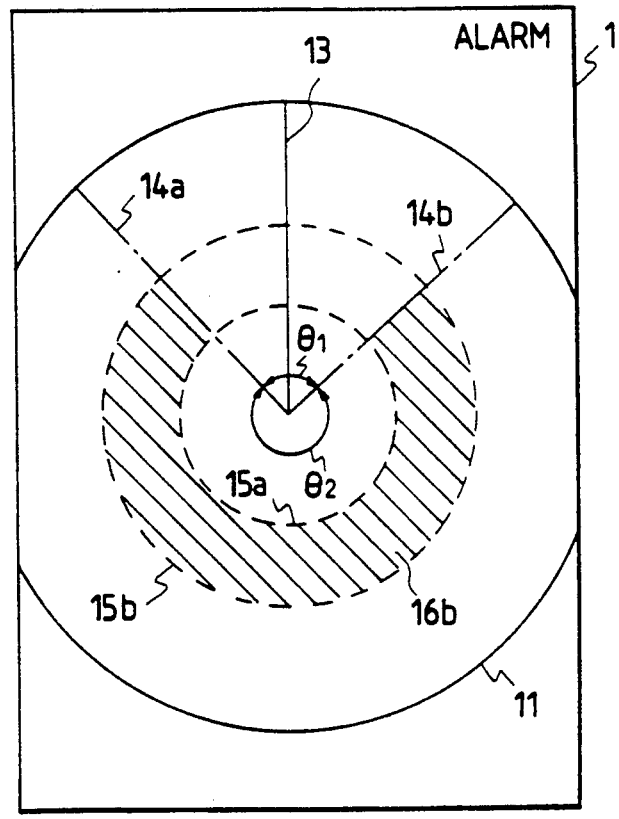
FIG. 6 shows still another image according to the embodiment of FIG. 1.
Figure 7:
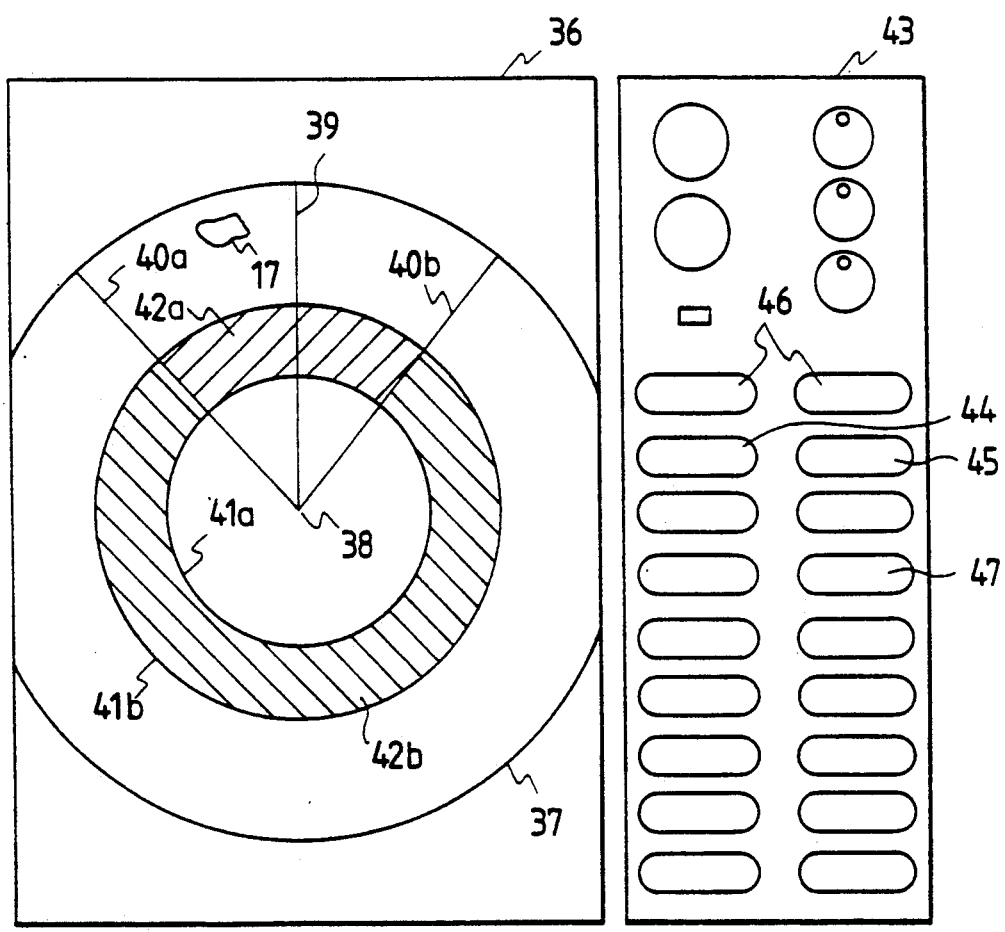
FIG. 7 is a front view of a display and an operating part of a conventional radar system.

If the ALARM button 24 is pushed again within a predetermined time period of the timer 32, i.e., within 2 seconds, the Max region 16b, having a greater angle between the angles $\Theta_1$ and $\Theta_2$ contained by the two EBL 14a and 14b as shown in FIG. 6, is set as the tentative watch alarm region. Timer 32 is then reset to allow selection of a watch alarm region in the controlling part 3 within 2 seconds.

During designation of a watch alarm region, the selected region is so indicated on the display to let the user known that the region 16a or 16b was tentatively set as the watch alarm region in the display part 1. ALARM indication 18 may be, for example, inversely represented, or only the region may be represented in a tone different from the another regions, as the tentative watch alarm region, for example, the Min region 16a, as shown in FIG. 5.

If the time period, i.e., 2 seconds, of the timer 32 for setting a watch alarm region elapsed without an operation of the ALARM button 24, the tentative watch alarm region at that time is determined as the selected watch alarm region. For instance, if the ALARM button 24 is pushed once, the smaller Min region 16a is determined, and if the ALARM button 24 is pushed again within the predetermined time period of the time 32 after the first push of the ALARM button 24, the larger Max region 16b is determined as shown in FIG. 6.

At that time, in order to let the user know that the region 16a is determined as the watch alarm region in the display part 1, the inverse representation of the ALARM display 18 is turned over into a non-inverse representation, or the region 16b is represented by a solid line, for example, to distinguish from the tentative setting state.

After that, an intrusion of an obstacle into the region 16a as a watch alarm region is reported by means of alarm sound to the user of the radar system, when the obstacle comes into the watch alarm region 16b and until the watch alarm region is released.

Although the time period of the timer for setting a watch alarm region in this embodiment is set at 2 seconds, it is unnecessary that the time period is limited to 2 seconds. Any time period may be adopted so long as the user feels it convenient during the setting operation.

An having been obvious from the above description, the present invention provides a radar system with a function for setting a watch alarm region, comprising a dividing means for dividing a region of a display screen in a display part, a selection means for selecting a divided region, and a setting means for setting the selected region as a watch alarm region. A user is able to select one of the regions at will among a plurality of the divided regions upon setting the watch alarm region, and if the watch alarm region has been set, differently from the that desired by the user, such the mistake may be readily corrected and the water alarm region may be reset.

Although the invention has been illustrated in connection with a preferred embodiment, it will be apparent that many of the details explained above may change without departing from the spirit and scope of the invention as set forth in the claims which follow.

What is claimed is:

1. A radar system comprising:
   transmitter means for radiating radio waves;
   receiver means for receiving returning waves reflected by an object to supply received signals and processing the received signals to supply video signals;
   display means for displaying an image representing information of the video signals supplied by the receiver means;
   means for drawing a plurality of border lines radially from a point of origin represented on the display means and, responsive to user input, moving the border lines;
   dividing means for dividing the represented image into plural regions defined by the border lines; and
   setting means for automatically setting the smallest region among the divided regions divided by the dividing means as a watch alarm region in accordance with setting instructions from the user.

2. A radar system according to claim 1, wherein the setting means comprises programmable processing means, said processing means being programmed for automatically designating the smallest region among said plurality of divided regions as said watch alarm region in response to a first setting instruction from the user, said processing means further being programmed for automatically designating another said divided region as the watch alarm region in response to a second setting instruction from the user.

3. A radar system comprising:
   transmitter means for radiating radio waves;
   receiver means for receiving returning waver reflected by an object to supply received signals and processing the received signals to supply video signals;
   display means responsive to said video signals for visually presenting information of the video signals generated by the receiver means;
   means for drawing two border lines radially from a point of origin represented on the display means and responsive to a user input, moving the two border lines in accordance with said user input;
   dividing means for dividing the visual presentation into two regions by the border lines drawn, and
   identifying and setting means for automatically identifying and setting a region having a smaller angle contained by the two border lines between the two regions divided by the dividing means as a watch alarm region.

4. A radar system according to claim 3, wherein said identifying and setting means comprises programmable processing means programmed for setting the region having a smaller angle contained by the two border lines between the two regions divided by the dividing means as said watch alarm region in response to a first setting instruction received from a user, said programmable processing means further being programmed for resetting the other of said two regions as the watch alarm region in response to a subsequent second setting instruction received from the user.

5. A radar system comprising:
   a transmitter for radiating radio waves;
   a receiver for receiving returning waves reflected by an object to supply received signals, and processing the received signals to supply video signals;
   display means representing information of the video signals visually;
   means for drawing two border lines radially from a point of origin represented on the display means and moving the two border lines in response to instructions received from a user;
   dividing means for dividing the represented image into two regions by the border lines drawn on the represented image; and
   means for automatically setting one region between the two regions divided by the dividing means as a watch alarm region in accordance with a first setting instruction received from said user, and thereafter, controlling the region different from the preceding to be the watch alarm region in accordance with each subsequent setting instruction received from the user.

6. A radar system comprising:
   a transmitter for radiating radio waves;
   a receiver for receiving returning waves reflected by an object to supply received signals and processing the received signals to supply video signals;
   display means responsive to said video signals for visually representing information of the video signals;
   means for drawing two border lines radially from a point of origin on the display means and moving the two border lines in response to instructions received from the user;
   dividing means for dividing the represented image into two regions by the border lines drawn in the represented image;
   programmable controller means,
   said programmable controller means being programmed for performing a first setting operation for determining and setting a region having a smaller angle contained by the two border lines between the two regions divided by the dividing means as a watch alarm region in response to a setting instruction from the user;
   said programmable controller means being programmed for performing a second setting operation for determining and setting a region having a greater angle contained by the two border lines between the two regions divided by the dividing means as the watch alarm region in response to said setting instruction from the user; and
   timer means for counting a predetermined time period after receiving the setting instruction from the user;
   said programmable controller means further being programmed for performing the first setting operation in response to receiving an initial setting instruction from the user, for thereafter alternately performing the second and first setting operations in response to receiving subsequent setting instruction from the user prior to completion of the count by the timer means, for resetting the timer means in response to receipt of each setting instruction, and for determining the watch alarm region after completion of the count for the predetermined time period without receiving a subsequent setting instruction since a reset operation of the timer.

7. A radar display system for receiving a radar signal, displaying said signal and providing a collision warning signal, comprising:

a visual display device receiving said radar signal and, in response, providing a graphic display of range and azimuth information to objects reflecting said radar signal;

operator input means for receiving operator designation of warning zone azimuth boundary information;

processor means receiving said warning zone azimuth boundary information and determining minimum and maximum warning zone sectors defined by said warning zone azimuth boundary information;

controller means for selecting and displaying on said display means radial lines corresponding to said warning zone azimuth boundary information and, in response to a user designation control signal, alternately selecting and displaying said maximum and minimum warning sectors; and alarm means responsive to detection of an object within a displayed one of said minimum and maximum warning sectors for supplying a warning signal.

8. The radar display system according to claim 7 wherein said display comprises a plan position indicator (PPI).

* * * * *